Feb. 8, 1955 D. J. McGEE 2,701,741
TRACTOR MOUNTED AND DRIVEN SILAGE BLOWER
Filed Oct. 23, 1953 3 Sheets-Sheet 1
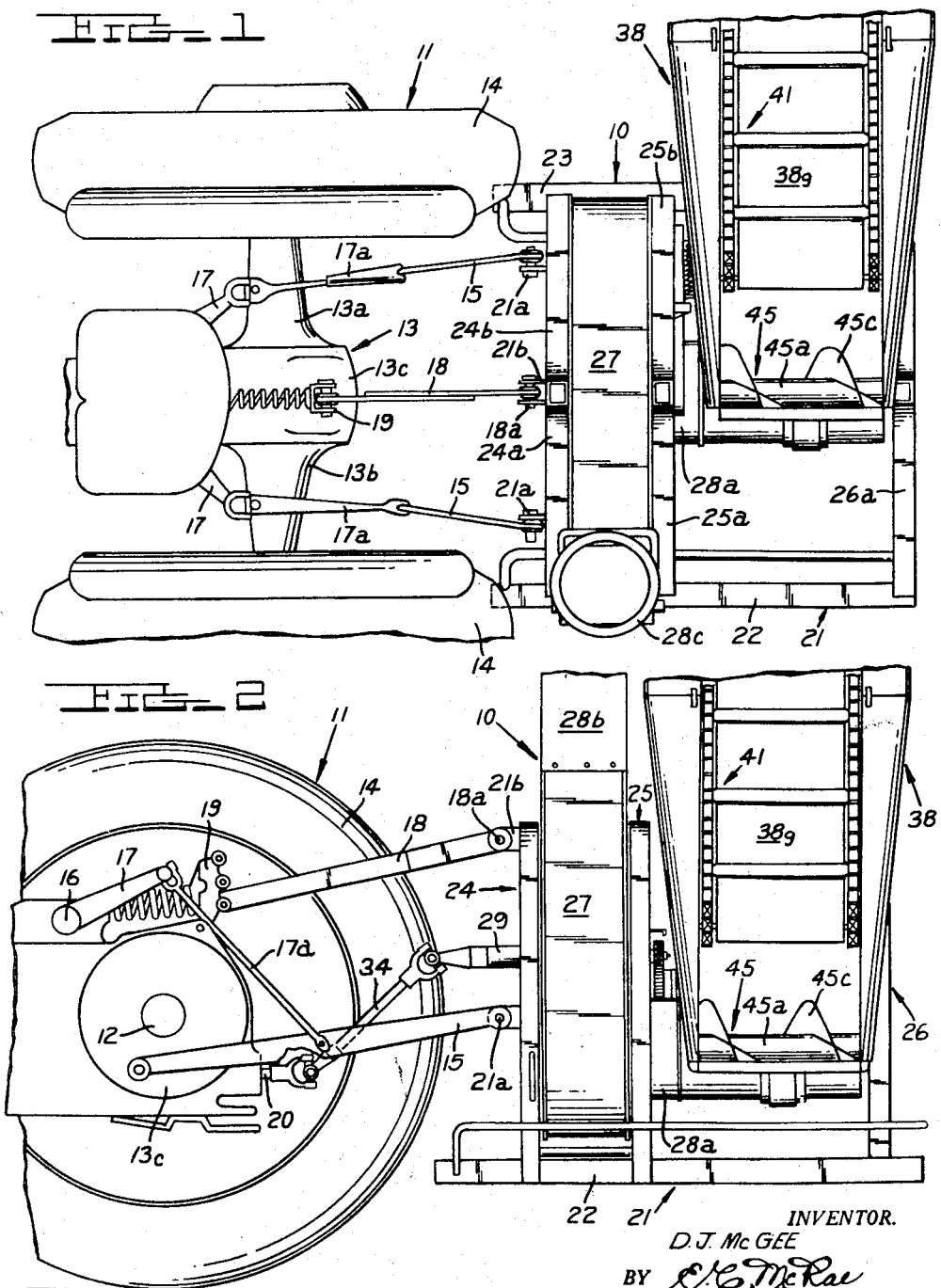
INVENTOR.
D. J. McGEE Feb. 8, 1955 D. J. McGEE 2,701,741
TRACTOR MOUNTED AND DRIVEN SILAGE BLOWER
Filed Oct. 23, 1953 3 Sheets-Sheet 2
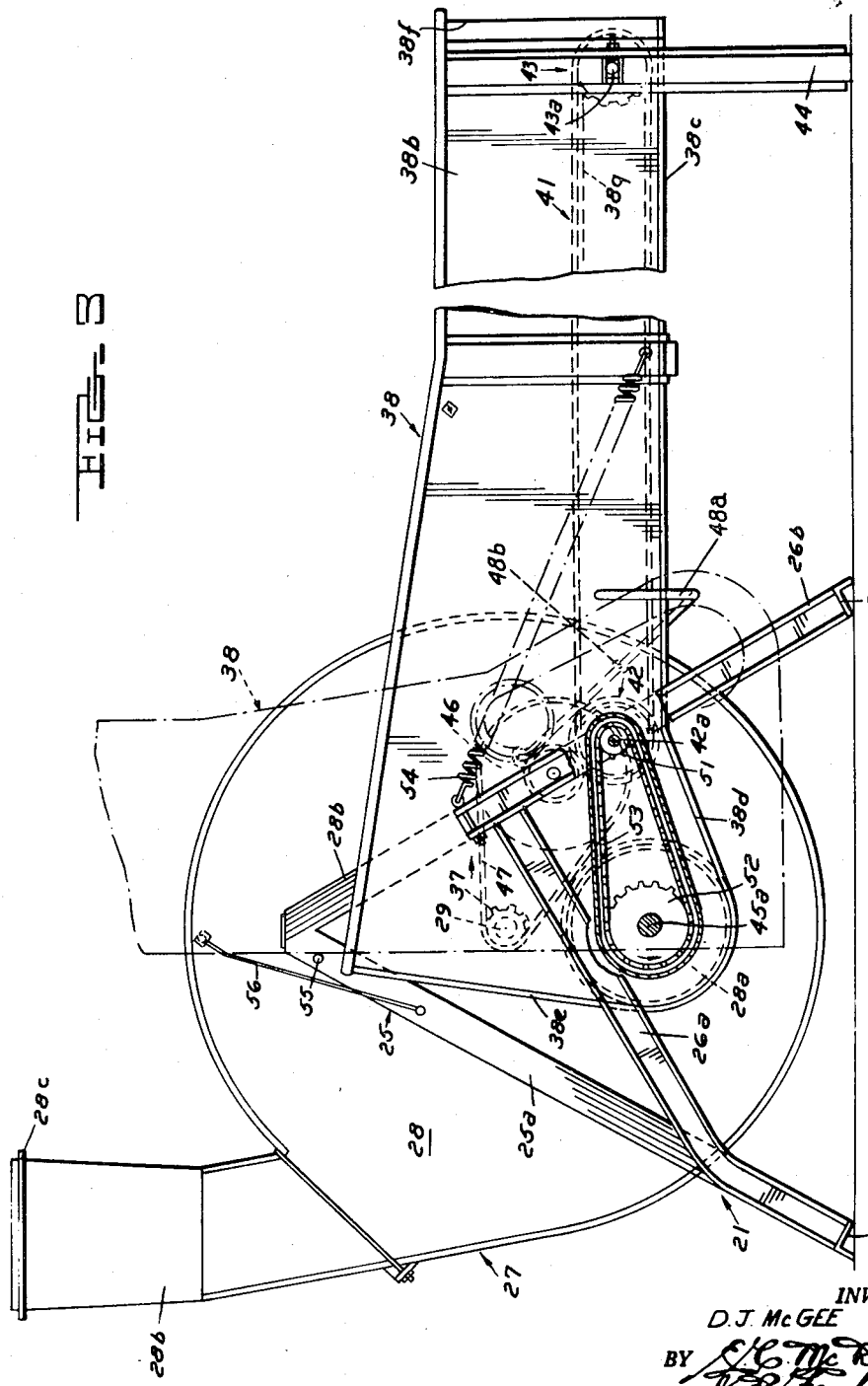
INVENTOR.
D. J. McGEE Feb. 8, 1955  D. J. McGEE  2,701,741
TRACTOR MOUNTED AND DRIVEN SILAGE BLOWER
Filed Oct. 23, 1953  3 Sheets-Sheet 3

INVENTOR.
D. J. McGEE
BY
ATTORNEYS

UNITED STATES PATENT OFFICE 2,701,741
Patented Feb. 8, 1955

2,701,741

TRACTOR MOUNTED AND DRIVEN SILAGE BLOWER

Donald J. McGee, Birmingham, Mich., assignor to Ford Motor Company, Dearborn, Mich., a corporation of Delaware Application October 23, 1953, Serial No. 387,866

1 Claim. (Cl. 302—37)

This invention relates to pneumatic conveying devices for comminuted materials such as chopped silage and the like. In a more specific aspect this invention relates to a pneumatic crop blower which is adapted to be mounted on a tractor for transport and which is adapted to be driven from the power take-off shaft of said tractor, while connected to the draft links thereof.

In a further aspect, this invention relates to a pneumatic crop blower having an infeed conveyor which is adapted to be swung upwardly to clear a mounted vehicle as the same is pulled past the blower into an unloading position.

Silage blowers are extensively used for conveying chopped crops to silos and other structures for storage prior to use. Such devices include a centrifugal blower and some form of conveyor for moving material into the blower. Heretofore these operating components have been mounted on a rigid frame which was either fitted with ground wheels or runners for transport. These prior structures have been unnecessarily expensive due to the ground wheels, axles and bearings therefor, and a tongue or hitch by which the blower was moved from place to place. It will of course be obvious that units which must be skidded or dragged from one location to another are very awkward to handle and are inconvenient to place in a desired operating position. Then too, the tractor for such units had to be carefully aligned therewith to effect the driving connection.

It is therefore an important object of the present invention to provide a readily portable crop blower which is adapted to be mounted on the power lifted hitch links of a tractor for transport.

It is a further object of the present invention to provide an improved, economically manufacturable portable crop blower which is adapted to be driven from the power take-off shaft of a tractor, to which it is attached for transport.

It is a further object to provide an improved tractor mounted crop blower having a conveyor which is adapted to be swung in a vertical plane to clear a passing vehicle without disengaging the driving mechanism therefor.

The specific nature of this invention, as well as other objects and advantages thereof, will become apparent to those skilled in the art from the following detailed description, taken in conjunction with the attached sheets of drawings on which, by way of preferred example only, is illustrated one embodiment of this invention.

On the drawings:

Figure 1 is a plan view of the present silage blower as it is mounted on the implement suspension system of a tractor of well known make, and connected to the power take-off shaft of said tractor.

Figure 2 is a side view of Figure 1, showing the silage blower in a transport position.

Figure 3 is a rear elevational view of the present silage blower showing the conveyor in a raised position in dotted outline.

As shown on the drawings:

Figure 5:
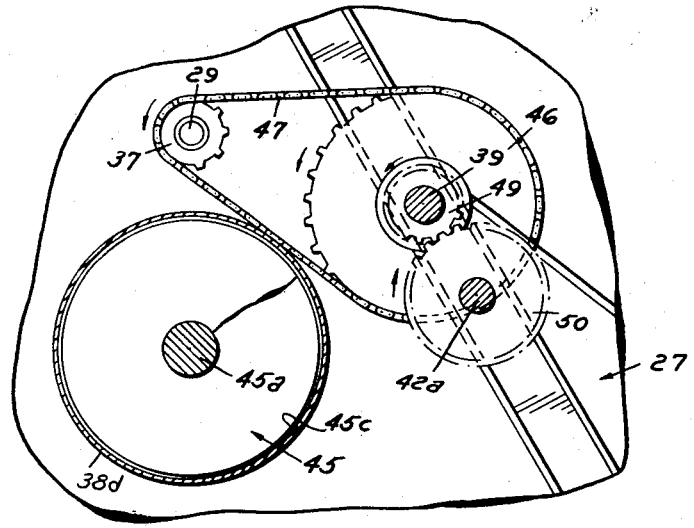
Figure 5 is a section view taken along the plane 5—5 of Figure 4.

In Figures 1 and 2 the present silage blower is indicated by reference numeral 10 and is shown mounted on a tractor 11 of well known make. Tractor 11 has a rear axle 12 rotatably journaled in a rear axle and differential housing 13. A pair of rear wheels 14 are secured to the ends of axle 12. Tractor 11 is equipped with a pair of power lifted draft links 15, which are pivotally attached at their forward ends to laterally spaced points on axle housings 13a and 13b, adjacent the differential housing 13c.

A transversely disposed rock shaft 16 is rotatably journaled in the upper forward portion of differential housing 13c and has a pair of lift arms 17 fixedly secured to its exposed ends. Lift arms 17 are connected to draft links 15 by means of connecting rods 17a. Rock shaft 16 is adapted to be rotated by the tractor's built-in hydraulic system which includes a piston and cylinder assembly located within housing 13c. Rotation of rock shaft 16 imparts an arcuate lifting movement to lift arms 17. This lifting movement is transferred to draft links 15 by connecting rods 17a. An adjustable length top link 18 is pivotally connected at its forward end to a rocker 19, located on the upper portion of housing 13c. The trailing ends of draft links 15 and top link 18 provide the conventional three-point implement suspension system for tractor 11, upon which the crop blower 10 is adapted to be mounted. Tractor 11 is also provided with a power take-off shaft 20 which extends rearwardly from the lower portion of differential housing 13c. Power take-off shaft 20 is powered from the tractor's gearing system and since such mechanism is well known, further description is not believed necessary.

The silage blower 10 comprises a frame 21 which includes a pair of longitudinally extending support members 22 and 23 and three longitudinally spaced, upstanding support frames 24, 25 and 26 which are welded at their lower ends to supports 22 and 23. Supports 24, 25 and 26 are of generally inverted V-shaped configuration and are comprised respectively of pairs of upwardly converging arms 24a and 24b, 25a and 25b, and 26a and 26b, which arms are welded together at their top ends. A light weight, rigid and serviceable frame is thus provided upon which the components of the present blower are operatively mounted.

Upon the forward side of support frame 24 there are provided three laterally and vertically spaced hitch points whereby the silage blower 10 is adapted to be mounted upon the previously described implement suspension system of tractor 11. These points include a pair of laterally spaced hitch pins 21a respectively secured in horizontal alignment to medial points on arms 24a and 24b. Draft links 15 are connected to pins 21a in the usual manner. A pair of spaced lugs 21b are welded to the apex of support frame 24 where arms 24a and 24b are joined, and such lugs are provided with aligned apertures for the reception of a pin 18a, whereby connection with top link 18 is effected.

A centrifugal blower 27 is snugly fitted between support frames 24 and 25. Blower 27 includes a generally cylindrical housing 28 which has a shaft 29 rotatably mounted therein. A multi-bladed fan 30 is mounted on shaft 29 within housing 28. Blower housing 28 includes a circular inlet opening 28a, Figure 3, located below the axis of shaft 29 in the radial housing wall adjacent the support 25. Blower housing 28 also includes a vertically directed tangential exhaust conduit 28b which terminates in a collar 28c whereby the blower 27 can be coupled to a suitable delivery pipe.

The blower shaft 29 is directly connected to the tractor's power take-off shaft 20 by means of a universally jointed, extensible shaft assembly 34. The rearward end of blower shaft 29 extends beyond housing 28 and projects a short distance beyond support 25. A sprocket 37 is fastened to the projecting end of shaft 29 and is operatively connected to the remainder of the driving mechanism of the machine in a manner to be later described.

As best shown in Figures 1 and 3, blower 10 includes an elongated conveyor trough 38 which extends laterally from frame 21. Conveyor trough 38 is of generally U-shaped cross section and has a pair of upstanding sides 38a and 38b which are joined by a horizontal floor 38c. Conveyor trough 38 terminates at its inner end in a downwardly sloping and curved floor section 38d and a vertically inclined end 38e.

Figure 4:
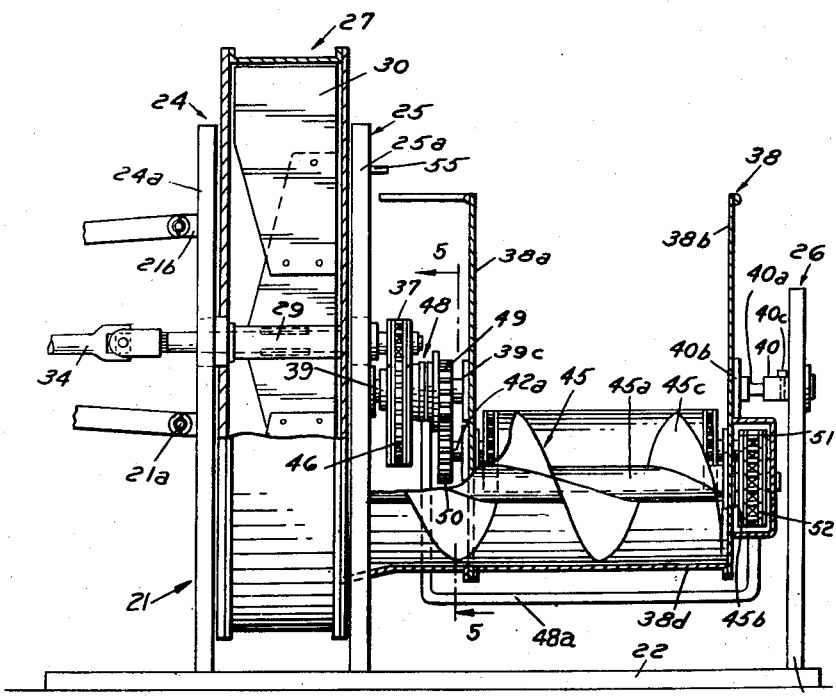
Figure 4 is an elevational view of the left hand side of the present silage blower with parts broken away in fragmentary section to show the drive mechanism and feed trough mountings.

As best shown in Figure 4, conveyor trough 38 is pivotally mounted near its inner end between support frames 25 and 26 for vertical movement. The pivotal mounting includes a horizontal shaft 39, welded at its one end to support 25. A thrust bushing 39c is welded to conveyor trough side 38a at a point above and forward of the junction between floor portions 38c and 38d, Figure 3. Bushing 39c rotatably engages shaft 39 and thus a support is provided for the forward side of trough 38. A horizontally disposed bushing 40 is welded to upstanding support 26 in axial alignment with shaft 39 and a thrust bushing 40b is welded to conveyor trough side 38b in coaxial alignment with the similar bushing 39c. A pivot pin 40a is inserted through bushing 40 and engages bushing 40b, for supporting the rear side of conveyor trough 38. A lock pin 40c secures pivot pin 40a in place.

A slat type raddle conveyor 41 is operatively mounted on a pair of shaft and sprocket assemblies 42 and 43, respectively located in longitudinally spaced positions in trough 38. Shaft and sprocket assembly 42 includes a shaft 42a supported transversely of conveyor trough 38 in antifriction bearings fastened to walls 38a and 38b. Shaft 42a is positioned slightly above and forward of the juncture between floor portions 38c and 38d, and is between floor 38d and pivot shaft 39. Shaft and sprocket assembly 43 is located adjacent an outer end 38f of conveyor trough 38. Adjusting screws are provided to shift the position of shaft 43a in order to maintain proper tension in conveyor 41. The upper flight of conveyor 41 travels upon a floor portion 38g which extends between sides 38a and 38b of conveyor trough 38. Conveyor trough 38 is provided beneath its outer end with an inverted, U-shaped ground-engaging support 44.

A transversely disposed auger conveyor 45 is operatively positioned adjacent the inner end 38e of conveyor trough 38 and is cradled within the curved bottom portion 38d. Auger conveyor 45 includes a shaft 45a upon which the auger vane 45c is mounted. A bearing 45b is fastened to conveyor side 38b which rotatably journals the outer end of shaft 45a and supports that end of the auger 45 a short distance above floor 38d. The other end of auger conveyor 45 is free and is rotatably supported upon the floor section 38d.

The drive mechanism for raddle conveyor 41 and auger conveyor 45 will now be described. Upon pivot shaft 39 which supports trough 38, is mounted a rotatable sprocket 46, Figure 5. This sprocket 46 is aligned with the sprocket 37 which is attached to the rear end of blower shaft 29 and the two sprockets are connected by means of a chain 47. As shown in Figure 5, a conventional pawl clutch 48 is interposed between sprocket 46 and a gear 49, rotatably mounted on pivot shaft 39. One half of pawl clutch 48 is adapted to be bolted to sprocket 46 and the other half is cast integrally with gear 49, which gear is also rotatably mounted on pivot shaft 39. A manual control lever 48a is pivotally mounted at 48b for engaging and disengaging clutch 48 as desired.

A gear 50 is secured to the forward end of raddle conveyor drive shaft 42a in alignment and engagement with gear 49. A sprocket 51 is secured to the rear end of the drive shaft 42a and a sprocket 52 is fastened to the projecting end of auger conveyor shaft 45a. Sprockets 51 and 52 are aligned and connected by chain 53. Thus power flows from fan shaft 29 via sprocket 37 and chain 47 to sprocket 46, through clutch 48 to gear 49 and on to raddle conveyor drive shaft 42a by means of gear 50. Auger conveyor 45 is powered as described. Thus a continuous and economical power train is provided which avoids duplicating drives.

A feature of the driving mechanism is that it remains engaged while conveyor trough 38 is tilted from a horizontal to a vertical position. In Figure 3, the conveyor trough 38 is shown as it is tilted about pivot shaft 39 and pivot pin 40a to a vertical position, either for transport or to clear a loaded vehicle which is being moved into position for unloading. As shown in Figure 5, gear 49 is mounted on pivot shaft 39, about which conveyor trough 38 is rotated, and gear 50 is mounted upon raddle conveyor drive shaft 42a, supported by conveyor trough 38. Thus as trough 38 is pivotally moved, gear 50 is rotated in an arc concentric to the axis of pivot shaft 39 and remains in engagement with gear 49 during such rotation. Thus power is immediately available to drive conveyors 41 and 45 when conveyor trough 38 is returned to a horizontal operating position. Clutch 48 will of course be manually disengaged when conveyor trough 38 is in vertical position to avoid unnecessary wear on the moving parts of conveyors 41 and 45. Of course, it will be obvious that the power take-off shaft of the tractor could be de-energized to halt the entire machine when a vehicle filled with silage is being moved into an unloading position.

A counterbalance spring 54 is fastened between a median point on conveyor trough 38 and the top of support 26. This spring aids in tilting conveyor trough 38 from a horizontal to a vertical position. A stop pin 55 is welded near the top of support 25 and a tie rod 56, pivotally connected at its one end to support arm 25a, is bolted to conveyor trough side 38a to lock conveyor trough 38 in a vertical position for transport.

It will thus be understood that an improved silage blower is provided by the present invention. The frame of the present blower is of unique configuration and is adapted to be readily attached to the implement suspension system of agricultural type tractors for transport. Thus the present blower is quickly and easily moved and placed in a desirable position for use. The present blower can be picked up, transported, placed in a desired spot and set in operation without being detached from the tractor upon which it is mounted, by virtue of the fact that it is also drivingly connected to the tractor's power take-off shaft. The pivoted conveyor trough extends laterally from the machine but is readily shifted to a vertical position and thus a mounted vehicle can be quickly moved into a position parallel to the tractor for unloading without interference.

It will, of course, be understood that various details of construction may be varied through a wide range without departing from the principles of this invention and it is, therefore, not the purpose to limit the patent granted hereon otherwise than necessitated by the scope of the appended claim.

I claim:

In a pneumatic crop conveyor, comprising in combination, a frame, said frame including first, second and third, longitudinally spaced, upstanding support members, a blower mounted between said first and second support members, and means for driving said blower, an elongated conveyor trough, means for pivotally mounting said trough near its one end between and on said second and third support members, said pivot means including a horizontal shaft fixedly secured to one of said support members, a conveyor in said trough, said conveyor having a drive shaft mounted parallel to said fixed pivot shaft, drive means extending between said blower and said conveyor including a first power transmitting element rotatably mounted on said fixed pivot shaft and a second power transmitting element secured to said conveyor drive shaft, and means operatively connecting said power transmitting element, said conveyor driveshaft being adapted to rotate in an arc concentric to the axis of said pivot shaft during pivotal movement of said trough whereby said power transmitting elements are continuously engaged as said trough is pivotally moved.

References Cited in the file of this patent

UNITED STATES PATENTS

| | | |
|---|---|---|
| 1,871,930 | Wallace | Aug. 16, 1932 |
| 2,630,351 | Hansen | Mar. 3, 1953 |